W. A. KIPER.
NUT LOCK.
APPLICATION FILED MAR. 7, 1913.

1,084,642.

Patented Jan. 20, 1914.

UNITED STATES PATENT OFFICE.

WOODFORD A. KIPER, OF CARROLLTON, KENTUCKY.

NUT-LOCK.

1,084,642.   Specification of Letters Patent.   Patented Jan. 20, 1914.

Application filed March 7, 1913. Serial No. 752,721.

*To all whom it may concern:*

Be it known that I, WOODFORD A. KIPER, a citizen of the United States, residing at Carrollton, in the county of Carroll and State of Kentucky, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in nut locks and comprises a simple and efficient device of this nature having various details of construction and combinations and arrangements of parts which will be hereinafter fully described, shown in the accompanying drawings and then specifically defined in the appended claim.

I illustrate my invention in the accompanying drawings, in which:—

Figure 1:
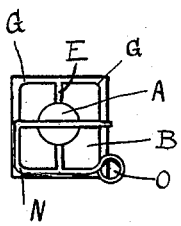
Figure 2:
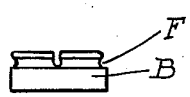
Figure 3:
Figure 4:
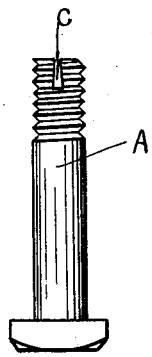

Figure 1 is an end view of a nut lock showing the application of my invention. Fig. 2 is an edge view of the nut. Fig. 3 is a detail view of the key, and Fig. 4 is an edge view of the bolt showing the slotted end.

Reference now being had to the details of the drawings by letter, A designates a bolt and B a nut having threaded connection therewith, the end of the bolt being slotted as at C. The nut is provided with radially disposed slots E extending through the wall thereof and is provided with a circumferential groove F, and one face of the nut has rounded corners G. A resilient key, designated by letter N, is provided with an eye O at one end. Said key is substantially bracket shaped and has two parallel arms which are spaced apart a distance equal to half the width of the outer face of the nut in order to allow one arm of the key to engage registering slots in the nut and bolt, while the other arm engages the groove in one edge of the nut, the curved portion of the key engaging the rounded corners of the front face of the nut, while a concaved part of the eye engages another corner, as shown. Said key being of a resilient material will spring into place and will securely hold the nut from turning in either direction. When it is desired to turn the nut, the key may be withdrawn from the slots and groove as will be readily understood.

What I claim to be new is:—

A nut lock comprising a bolt with a slotted end, a nut fitted to said bolt provided with a shouldered portion extending entirely about the periphery thereof and grooved, said nut having a transverse slot intersecting its bore and opening into said grooved portion, a bracket-shaped locking member, the arms of which are resilient, portions of which are adapted to engage parts of the groove at right angles to each other and one arm engaging slots in the nut and bolt, one end of said member turned to form an eye, the concaved outer edge of which is adapted to engage about the rounded corner of the groove in the nut, as shown and described.

In testimony whereof I hereunto affix my signature in the presence of two witnesses.

WOODFORD A. KIPER.

Witnesses:
GEO. B. WINSLOW,
MARY MASTERSON.

Copies of this patent may be obtained for five cents each, by addressing the "Commissioner of Patents, Washington, D. C."